US 8,588,767 B2

(12) United States Patent
Fujimoto et al.

(10) Patent No.: US 8,588,767 B2
(45) Date of Patent: Nov. 19, 2013

(54) MOBILE TERMINAL DEVICE, SELF-DIAGNOSIS METHOD AND NON-TRANSITORY, COMPUTER READABLE STORAGE MEDIUM

(75) Inventors: Shingo Fujimoto, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 13/409,795

(22) Filed: Mar. 1, 2012

(65) Prior Publication Data

US 2012/0252441 A1  Oct. 4, 2012

(30) Foreign Application Priority Data

Mar. 31, 2011 (JP) ................................ 2011-080453

(51) Int. Cl.
*H04W 24/00* (2009.01)
(52) U.S. Cl.
USPC ........... 455/425; 455/423; 455/424; 455/418; 455/550.1
(58) Field of Classification Search
USPC ........................ 455/423, 424, 425, 550.1, 418
See application file for complete search history.

(56) References Cited

U.S. PATENT DOCUMENTS 7,805,136 B1 * 9/2010 Everson et al. ............... 455/423

FOREIGN PATENT DOCUMENTS

| JP | 2007-150543 | 6/2007 |
| JP | 2007-158893 | 6/2007 |
| JP | 2009-194726 | 8/2009 |

* cited by examiner

*Primary Examiner* — Kathy Wang-Hurst
(74) *Attorney, Agent, or Firm* — Staas & Halsey LLP

(57) ABSTRACT

A mobile terminal device includes a self-diagnosis unit that diagnoses a problem in the application, a modifying unit that modifies a start command to start the application in a state in which the self-diagnosis unit is activated, a specification receiving unit that executes the modified start command upon receiving a specification of the application, an operation procedure display unit that displays an operation procedure that a user executes before a start of the application when the modified start command is executed, a memory unit in which log data indicating a result of a user operation on the application is stored by the activated self-diagnosis unit, and a log data transmitting unit that transmits the log data stored in the memory unit through a network to a remote management server that manages the application problem when a completion of the diagnosis by the self-diagnosis unit is detected.

8 Claims, 13 Drawing Sheets

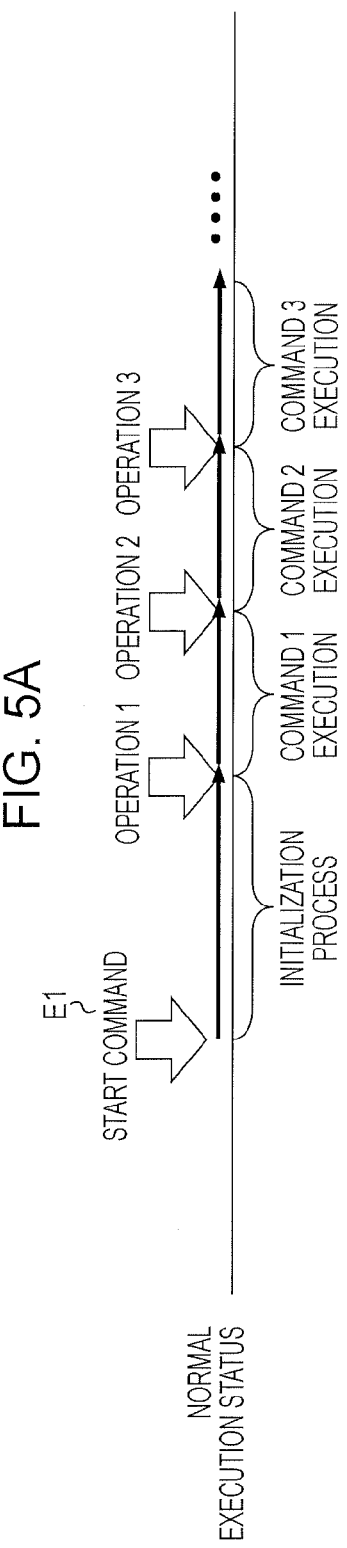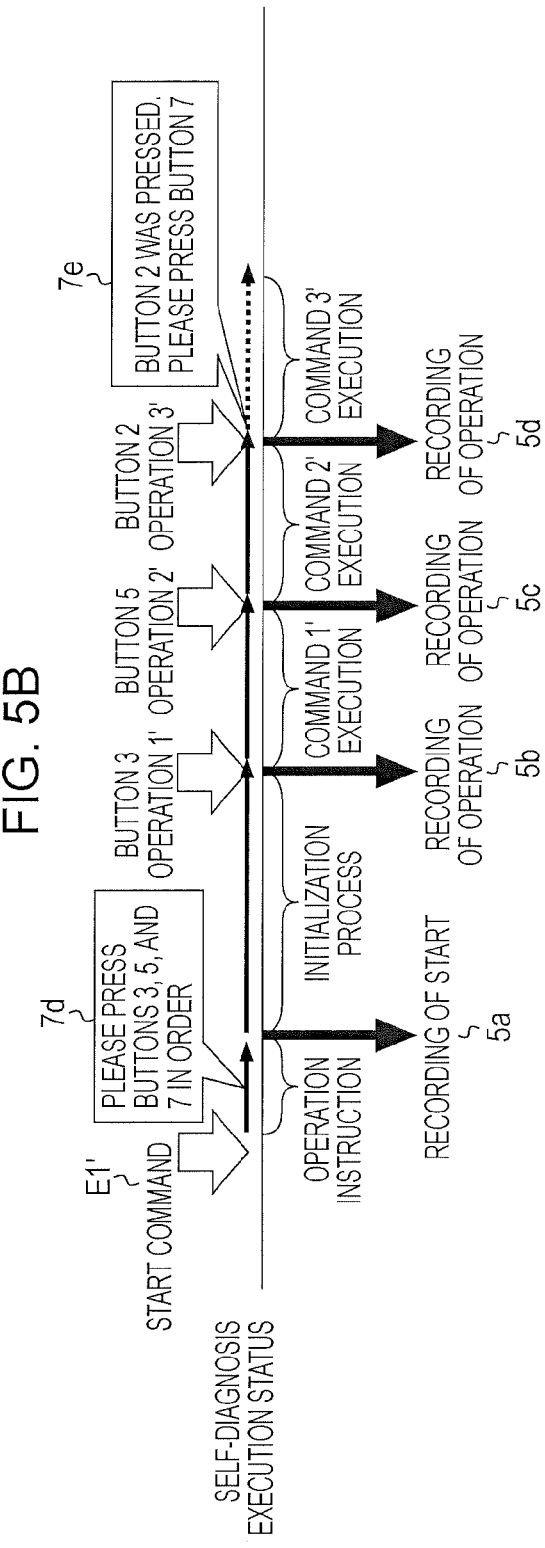

FIG. 7

```
                    ┌7a
      [SelfCheckRequest]
71 ─  Target : ReadMail.exe
72 ─  GuideMsg : "IMPLEMENT OPERATION TEST, IMPLEMENT OPERATION
      TEST PRESS 'OK' AND THEN PRESS NUMBER KEYS 3-5-7 IN ORDER
      WITH THE ACTIVE APP"
73 ─  On_Error : All_Logs
      [Recording]
74 ─  KeyEvent, TraceLog, PanicLog, Snapshot
      [Scenario]
      Step_01 :
75 ─  Expect PushBtn_3
76 ─  On_UnExpected : Show "PRESS CLR BUTTON TO RETURN"
      Step_02 :
      Expect PushBtn_5
      On_UnExpected : Show "PRESS CLR BUTTON TO RETURN"
      Step_03
      Expect PushBtn_7
77 ─  On_UnExpected : Restart_App
      PushBtn_5, PushBtn_7
      Step_04
78 ─  Final
79 ─  Report All_Logs
```

MOBILE TERMINAL DEVICE, SELF-DIAGNOSIS METHOD AND NON-TRANSITORY, COMPUTER READABLE STORAGE MEDIUM

CROSS-REFERENCE TO RELATED APPLICATION

This application is based upon and claims the benefit of priority of the prior Japanese Patent Application No. 2011-080453, filed on Mar. 31, 2011, the entire contents of which are incorporated herein by reference.

FIELD

The embodiment discussed herein is related to a mobile terminal device that can conduct a self-diagnosis on an application, and a self-diagnosis method.

BACKGROUND

Mobile terminal devices equipped with telephone functions are in widespread use. A mobile terminal device equipped with a telephone includes, for example, a mobile telephone and the like. However, daily life may be adversely affected when a problem occurs in the mobile terminal device which the user usually carries because of the included telephone function. Therefore, manufacturers and the like are expected to provide quick countermeasures for such problems.

For example, there has been proposed a technique that allows testing of a breakdown phenomenon that occurs in an integrated circuit mounted in a mobile terminal device through a downloaded test program (See Japanese Laid-open Patent Publication No. 2007-150543).

When a mobile terminal device such as a mobile telephone and the like does not operate as expected by a user, the user first takes the device to the dealer. Although the user tells the dealer about the conditions of the problem of the mobile terminal device, the user may have to leave the mobile terminal device at the store to undergo repairs by the manufacturer (deposited for repair) depending on the conditions of the problem since specialized knowledge for determining whether the problem is hardware related or software related may be used. The user then can not use the mobile terminal device during the repair period since the device is deposited with the dealer.

Conversely, a problem claimed by a user when the mobile terminal device does not operate as expected is not necessarily limited to a function (application) problem. For example, the application may be running normally and the problem may be due to user's incorrect operation. In this case, the condition that is considered a problem may be solved simply by explaining a correct operation procedure to the user and thus the device does not have to be left for repair.

Therefore, an international standard specification such as, for example, Open Mobile Alliance-Device Management (OMA-DM) is developed to execute a self-diagnosis test function that determines whether or not functions are operating normally from a remote location, and a collecting function that collects the results of self-diagnosis test, have started to be equipped on mobile terminal devices.

However, there is a problem in that a technique for testing a user's mobile terminal device by using a dedicated test program or application as disclosed in the abovementioned related art does not record and reproduce user's operations when the problem occurred. Moreover, since a problem reproduction test is not conducted, and it is difficult to collect appropriate operation logs for making a diagnosis the problem which is the user claimed, or a log which indicates normal or broken down internal states of the mobile terminal device.

More suitable diagnoses and quick countermeasures are desired in mobile terminal devices due to the diversification of problems in loaded applications and hardware and the large number of functions that can be realized by many types of software.

SUMMARY

According to an aspect of an embodiment, a mobile terminal device includes a self-diagnosis unit that, in response to a user operation on an application to be diagnosed, diagnoses a problem in the application, a modifying unit that modifies a start command menu to start the application in a state of the self-diagnosis unit is activated, a specification receiving unit that executes the modified start command upon receiving a specification of the application, an operation procedure display unit that displays an operation procedures that a user should execute before a start of the application, when the modified start command is executed, a memory unit in which log data recording user operations on the application is stored by the activated self-diagnosis unit, and a log data transmitting unit that transmits the log data stored in the memory unit through a network to a remote management server that manages the application problems when the completion of the diagnosis by the self-diagnosis unit is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B illustrate application execution states.
FIG. 7 is an example of scenario contents.

DESCRIPTION OF EMBODIMENT

The present embodiment will be explained with reference to the drawings. A self-diagnosis method in a system according to the present embodiment causes an operation for an application to realize a mobile terminal device function to be reproduced by the user to determine whether there is a problem due to user operation or whether there is an application problem (bug) from the condition of the actual operations conducted by the user during the problem reproduction test and the condition of the application actions in response to the actual operations by the user.

Figure 1:
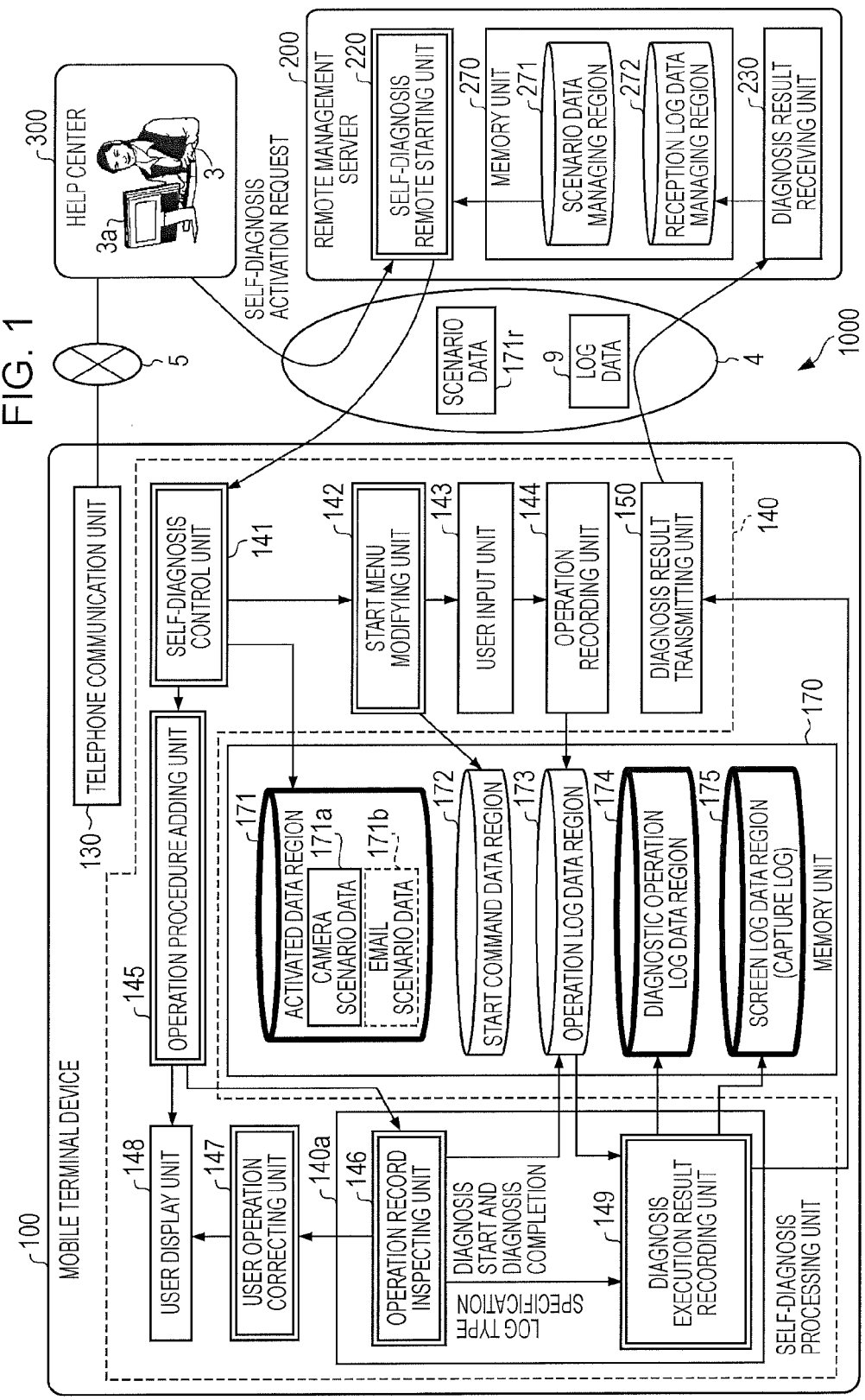
FIG. 1 is an example of a system configuration.

A system according to the present embodiment has a system configuration as illustrated in FIG. 1. FIG. 1 illustrates an example of a system configuration. In a system 1000 illustrated in FIG. 1, a mobile terminal device 100 is connected to a remote management server 200 through a network 4. The mobile terminal device 100 is also connected to a help center 300 through a telephone network 5. The help center 300 and the remote management server 200 are connected through the network 4.

When an unexpected result occurs in the mobile terminal device 100 carried by a user, the user calls the help center 300 to be consulted by an operator 3 about the issue in the system 1000. The operator 3 sends out a self-diagnosis activation request that includes transmission target information of scenario data 171r for conducting a remote analysis to indicate a telephone number and an email address of the mobile terminal device 100, and remote diagnosis type information from a terminal 3a such as a personal computer (PC) and the like to the remote management server 200.

The remote diagnosis type information is information that specifies a type for diagnosing a function used when the problem in the user's mobile terminal device 100 occurred. The remote diagnosis type may also have an application name.

The scenario data 171r is data that includes information to specify a log type and the like and operation instructions for guiding user to operate the mobile terminal device 100. The scenario data 171r also identifies a function to be diagnosed using function identification information to distinguish between the functions of the mobile terminal device 100. The function identification information may include an application name to specify the application that implements the function as well as information to specify the function in detail.

The remote management server 200 is a server device that manages an application problem of the mobile terminal device 100. The remote management server 200 transmits to the mobile terminal device 100 the scenario data 171r corresponding to the remote diagnosis type information for the transmission target information specified by the self-diagnosis activation request in response to the self-diagnosis activation request from the help center 300.

When the mobile terminal device 100 receives the scenario data 171r, the user is caused to actually operate the desired application according to the scenario data 171r to obtain log data 9 related to the problem. The log data 9 related to the problem is transmitted to the remote management server 200 so that a diagnosis is conducted by the remote management server 200 based on the log data 9.

A functional configuration according to the abovementioned self-diagnosis method will be explained with reference to FIG. 1.

The mobile terminal device 100 includes a telephone communication unit 130, a self-diagnosis processing unit 140, and a memory unit 170. The memory unit 170 includes an activated data region 171, a start command data region 172, an operation log data region 173, a diagnostic operation log data region 174, and a screen log data region 175 to store data related to self-diagnosis processing. The memory unit 170 corresponds to a portion of a storage region in a memory unit 12 illustrated in FIG. 2.

The telephone communication unit 130, a user input unit 143, an operation recording unit 144, a diagnosis result transmitting unit 150, a user display unit 148, the self-diagnosis processing unit 140, the activated data region 171, the start command data region 172, the operation log data region 173, the diagnostic operation log data region 174, and the screen log data region 175 are implemented by processing conducted by programs executed by a CPU 11 to be described below.

The telephone communication unit 130 is a processing unit that conducts telephone communication so a user can talk through a telephone network.

The self-diagnosis processing unit 140 further includes a self-diagnosis control unit 141, a start menu modifying unit 142, the user input unit 143, the operation recording unit 144, an operation procedure adding unit 145, an operation record inspecting unit 146, a user operation correcting unit 147, the user display unit 148, a diagnosis execution result recording unit 149, and the diagnosis result transmitting unit 150.

The self-diagnosis control unit 141 is a processing unit that activates the self-diagnosis processing when the scenario data 171r is received from the remote management server 200. For example, when email scenario data 171b for conducting a self-diagnosis of email functions is received from the remote management server 200 as the scenario data 171r, the self-diagnosis control unit 141 adds the email scenario data 171b to the activated data region 171. As a result of adding the email scenario data 171b, previously obtained camera scenario data 171a and the email scenario data 171b are stored in the activated data region 171. The self-diagnosis control unit 141 instructs the start menu modifying unit 142 to rewrite the application start command.

Upon being activated by the self-diagnosis control unit 141, the start menu modifying unit 142 modifies the start menu by rewriting a start command for starting an application stored in the start command data region 172 such that when a user selects the application from the start menu, the selected application is executed through the self-diagnosis processing unit 140. The start command rewriting method will be described below. A start menu using the rewritten start command is displayed on a display unit 13 (see FIG. 2) of the mobile terminal device 100 after the start command is rewritten.

Figure 2:
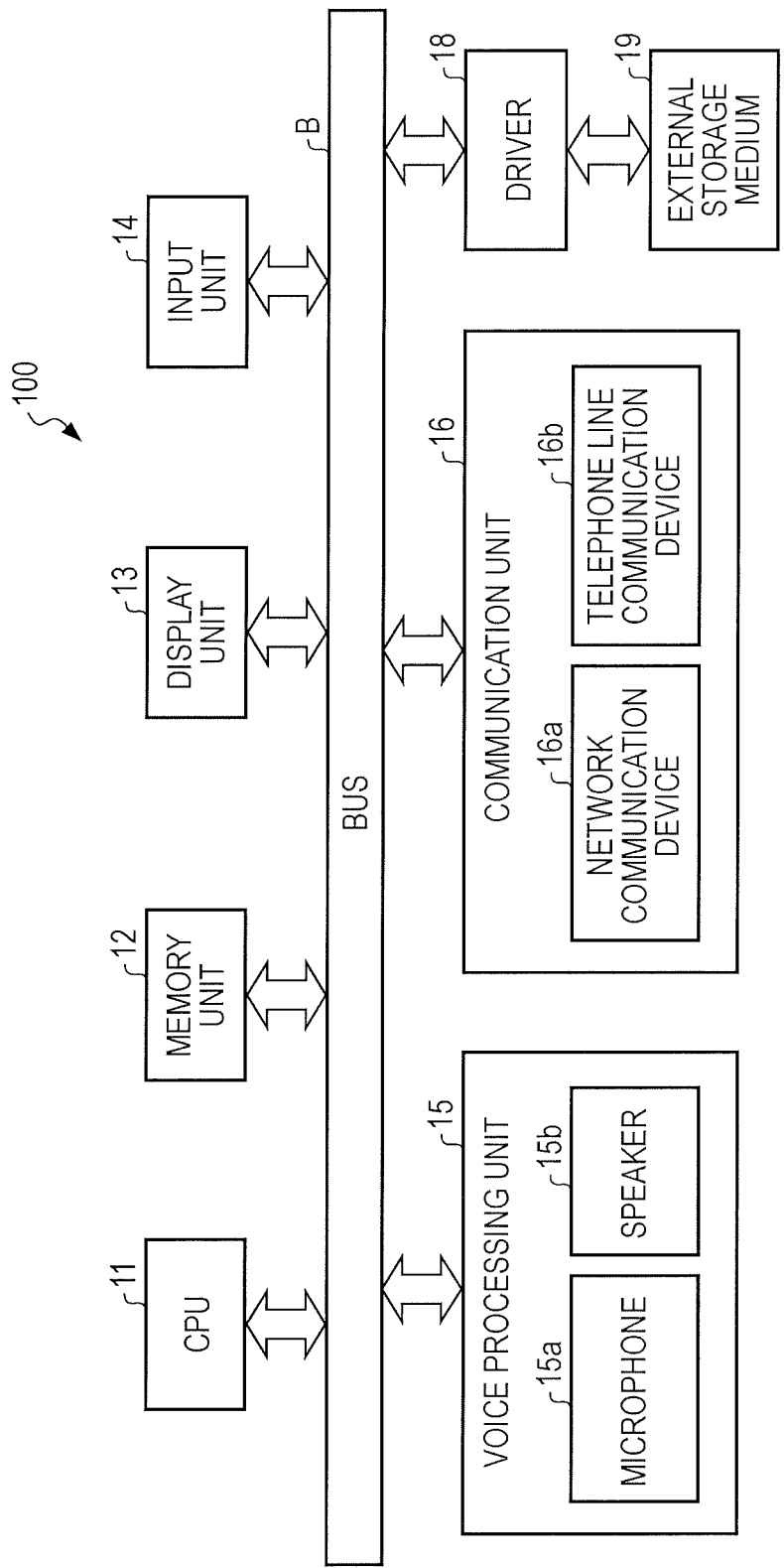
FIG. 2 is a block drawing of a hardware configuration of a mobile terminal device.

The user input unit 143 receives information inputted by the user who selects desired information the screen displayed on the display unit 13 (see FIG. 2). When the application to be diagnosed as desired by the user is selected from the start menu, the user input unit 143 receives information specifying the application selected by the user.

The operation recording unit 144 adds and records operation log data describing the user operations in the operation log data region 173 in response to the reception of the user input from the user input unit 143.

Conversely, in response to the user selecting the application to be diagnosed, the self-diagnosis control unit 141 instructs the operation procedure adding unit 145 to specify the scenario data 171r corresponding to the selected application and to add the scenario data 171r to the screen display provided by the application to indicate an operation procedure to be conducted by the user.

The operation procedure adding unit 145 obtains the operation procedure for guiding the user operations from the specified scenario data 171r in response to the instruction from the self-diagnosis control unit 141, and then instructs the user display unit 148 to display the operation procedure before starting the selected application. The operation procedure adding unit 145 also notifies the operation record inspecting unit 146 about the start of the diagnosis. The scenario data 171r is specified in the notification about the start of the diagnosis. For example, the email scenario data 171b may be specified when an email function self-diagnosis is to be conducted.

The operation record inspecting unit 146 notifies the user operation correcting unit 147 and the diagnosis execution result recording unit 149 about the start and completion of the diagnosis. The operation record inspecting unit 146 specifies a log type to the diagnosis execution result recording unit 149 based on the scenario data 171r selected in the diagnosis start notification.

The operation record inspecting unit 146 also specifies the scenario data 171r when notifying the start of the diagnosis. After the diagnosis has started, the operation record inspecting unit 146 inspects the operation log data region 173 to determine whether or not new operation log data is stored therein. If new operation log data is detected, the operation record inspecting unit 146 notifies the user operation correcting unit 147 about the operation information that indicates the user operations.

The user operation correcting unit 147 refers to the scenario data 171r to determine whether or not the user operations match the operation procedure specified in the scenario data 171r based on the operation information. If the user operations do not match the operation procedure specified in the scenario data 171r, the user operation correcting unit 147 causes the user display unit 148 to display a message to encourage the user to redo the operations on the display unit 13 (see FIG. 2).

The user display unit 148 conducts a display on the display unit 13 (see FIG. 2) according to an instruction from the operation procedure adding unit 145 or the user operation correcting unit 147.

The diagnosis execution result recording unit 149 obtains operation log data corresponding to the specified log type from the operation log data region 173 in response to the diagnosis start notification from the operation record inspecting unit 146, and then stores the operation log data in the diagnostic operation log data region 174. The diagnosis execution result recording unit 149 also captures screens at specific intervals or at each time a phenomenon specified in the scenario data 171r occurs during the period from the diagnosis start to the diagnosis completion. The diagnosis execution result recording unit 149 then adds and records screen log data with a time stamp added to the captured screen data in the screen log data region 175. The diagnosis execution result recording unit 149 requests the diagnosis result transmitting unit 150 to transmit the log data stored in the memory unit 170 to the remote management server 200 in response to a diagnosis completion notification from the operation record inspecting unit 146.

The operation record inspecting unit 146 and the diagnosis execution result recording unit 149 may be configured as one self diagnosis unit 140a.

The diagnosis result transmitting unit 150 transmits the operation log data stored in the diagnostic operation log data region 174 in the memory unit 170 and the screen log data stored in the screen log data region 175 in the memory unit 170, to the remote management server 200 through the network 4 in response to the request from the diagnosis execution result recording unit 149.

The user is also able to determine by him or herself the desired function to be diagnosed. In this case, the self-diagnosis control unit 141 may instruct the start menu modifying unit 142 to modify the start command of the corresponding application for all the scenario data 171r already existing in the activated data region 171.

Moreover, the modified start command may be rewritten back to the usual start command by the start menu modifying unit 142 when the diagnosis is completed. When the cause of the problem is simply the user not being used to an operation, inconvenience caused by depositing the device for repair can be avoided and the user can learn the correct operation by being guided through the correct operation using the operation procedure.

The activated data region 171 is a storage region for storing the scenario data 171r for each function received from the remote management server 200. For example, the activated data region 171 stores the camera scenario data 171a for diagnosing operations of the camera function, and the email scenario data 171b and the like.

The start command data region 172 is a storage region for storing the start command for starting each application. If multiple applications exist, start commands corresponding to each application are stored in the start command data region 172. When a user selects a function (application) from the start menu, the corresponding start command is read out and executed by the CPU 11 (see FIG. 2) to start the selected application.

The operation log data region 173 is a storage region for chronologically accumulating and storing operation logs describing user operations.

The diagnostic operation log data region 174 is a storage region for storing log data of log types specified in the scenario data 171r. The screen log data region 175 is a storage region for storing the screen log data with the time stamp added to the captured screen data from the diagnosis start to the diagnosis completion.

The remote management server 200 includes a self-diagnosis remote starting unit 220, a diagnosis result receiving unit 230, and a memory unit 270. The memory unit 270 corresponds to a portion of a storage region of a memory unit 212 and a storage device 217 illustrated in FIG. 3, and includes a scenario data managing region 271 and a reception log data managing region 272.

The self-diagnosis remote starting unit 220, the diagnosis result receiving unit 230, the scenario data managing region 271, and the reception log data managing region 272 are implemented by processing conducted by a program executed by a CPU 211 (see FIG. 3) which is described below.

The self-diagnosis remote starting unit 220 obtains, from the scenario data managing region 271 in the memory unit 270, the scenario data 171r corresponding to the remote diagnosis type information specified in the self-diagnosis activation request in response to the self-diagnosis activation request transmitted from the help center 300 through the network 4, and then transmits the scenario data 171r to the mobile terminal device 100.

The diagnosis result receiving unit 230 adds and stores transmission source information in the received log data 9 in the memory unit 270 upon receiving the log data 9 from the mobile terminal device 100 via the network 4. The log data 9 stored in the memory unit 270 includes the screen log data and the operation log data obtained during the self-diagnosis processing of the mobile terminal device based on the scenario data 171r.

The scenario data managing region 271 is a storage region for storing and managing the scenario data 171r for each function of the mobile terminal device 100 to be diagnosed. The camera scenario data 171a and the email scenario data 171b and the like are stored and managed in the scenario data managing region 271 as scenario data 171r for each function.

The reception log data managing region 272 is a storage region for storing the log data 9 that includes the operation log data and the screen log data received from the mobile terminal device 100.

FIG. 2 is a block drawing of a hardware configuration of the mobile terminal device 100. The mobile terminal device 100 illustrated in FIG. 2 is a terminal device controlled by a computer and includes the central processing unit (CPU) 11, a memory unit 12, the display unit 13, an input unit 14, a voice processing unit 15, a communication unit 16, and a driver 18, all of which are connected to a system bus B.

The CPU 11 controls the mobile terminal device 100 according to a program stored in the memory unit 12. The memory unit 12 uses a random access memory (RAM) and a read-only memory (ROM) and the like to store programs executed by the CPU 11, data for processing by the CPU 11, data obtained by the processing by the CPU 11, and the like. A portion of a region of the memory unit 12 is allocated as a work area to be used for processing by the CPU 11.

The display unit 13 displays various types of information desired for control under the CPU 11. The input unit 14 includes a mouse, a keyboard, and the like, and is used to allow a user to input the desired various types of information for the mobile terminal device 100 to conduct processing.

The voice processing unit 15 controls the input and output of sound and includes a microphone 15a and a speaker 15b. The microphone 15a is a sound input device, and the speaker 15b is a sound output device.

The communication unit 16 includes a network communication device 16a and a telephone line communication device 16b. The network communication device 16a is a device that controls communication to an external device such as the remote management server 200 (see FIG. 1), and is connected to, for example, the Internet or a local area network (LAN) and the like. The telephone line communication device 16b is a device that provides a telephone function that allows spoken communication by controlling communication connections made through telephone calls.

The driver 18 provides an interface for writing data to an external storage medium 19 and for reading out data from the external storage medium 19. The external storage medium 19 may be a flash memory type electronic medium such as a micro SD and the like.

Figure 3:
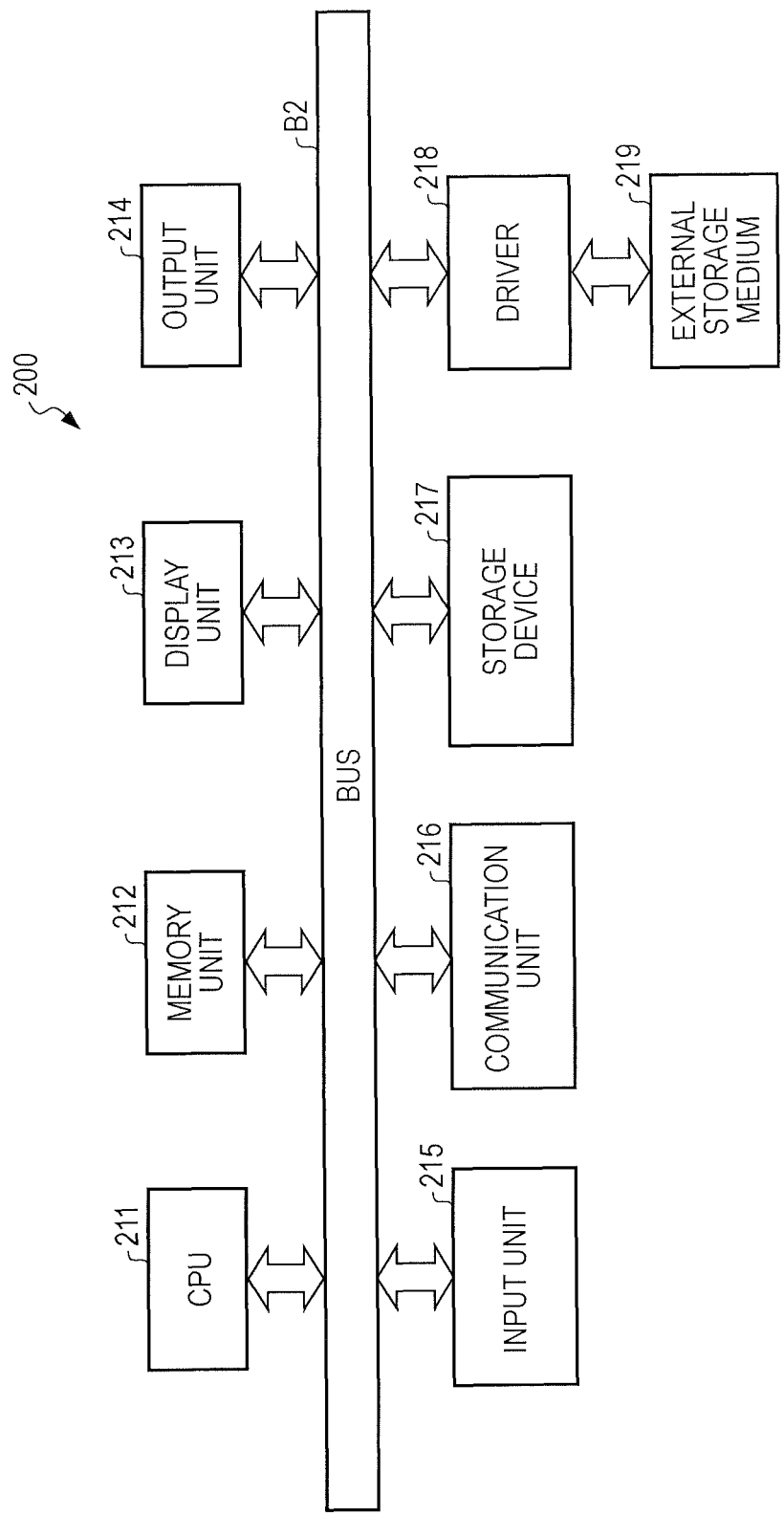
FIG. 3 is a block drawing of a hardware configuration of a remote management server.

FIG. 3 is a block drawing of a hardware configuration of the remote management server 200. The remote management server 200 illustrated in FIG. 3 is a server device controlled by a computer and includes the CPU 211, a memory unit 212, a display unit 213, an output unit 214, an input unit 215, a communication unit 216, a storage device 217, and a driver 218, all of which are connected by a system bus B2.

The CPU 211 controls the remote management server 200 according to a program stored in the memory unit 212. The memory unit 212 uses a RAM or a ROM and the like to store programs executed by the CPU 211, data for processing by the CPU 211, data obtained by the processing by the CPU 211, and the like. A portion of a region of the memory unit 212 is allocated as a work area to be used for processing by the CPU 211.

The display unit 213 displays various types of information desired for control under the CPU 211. The output unit 214 includes a printer and the like, and is used to output various types of information according to an instruction from a user. The input unit 215 includes a mouse, a keyboard, and the like, and is used to allow a user to input the desired various types of information for the remote management server 200 to conduct processing. The communication unit 216 is a device for controlling communication with an external device and is connected to, for example, the Internet or a LAN and the like. The storage device 217, for example, is used by a hard disc unit to store data such as programs for executing various types of processing.

A program for implementing processing conducted by the remote management server 200 may be provided to the remote management server 200 by, for example, a storage medium 219 such as a compact disc-read only memory (CD-ROM). Specifically, when the storage medium 219 storing a program is loaded into the driver 218, the driver 218 reads the program from the storage medium 219 to install the read program onto the storage device 217 via the system bus B2. When the program is started, the CPU 211 begins processing according to the program installed on the storage device 217. The medium for storing programs is not limited to a CD-ROM, and any computer-readable medium may be used. Besides a CD-ROM, a portable recording medium such as a DVD disc or a USB memory device, or a semiconductor memory such as a flash memory device may be used as a computer-readable storage medium.

Moreover, a program that implements processing conducted by the remote management server 200 may be provided from an external device via the communication unit 216. Alternatively, a configuration may be used in which the program is provided to the external device so that below mentioned processing is implemented on the external device. Communication through the communication unit 216 may be wired or wireless.

Figure 4:
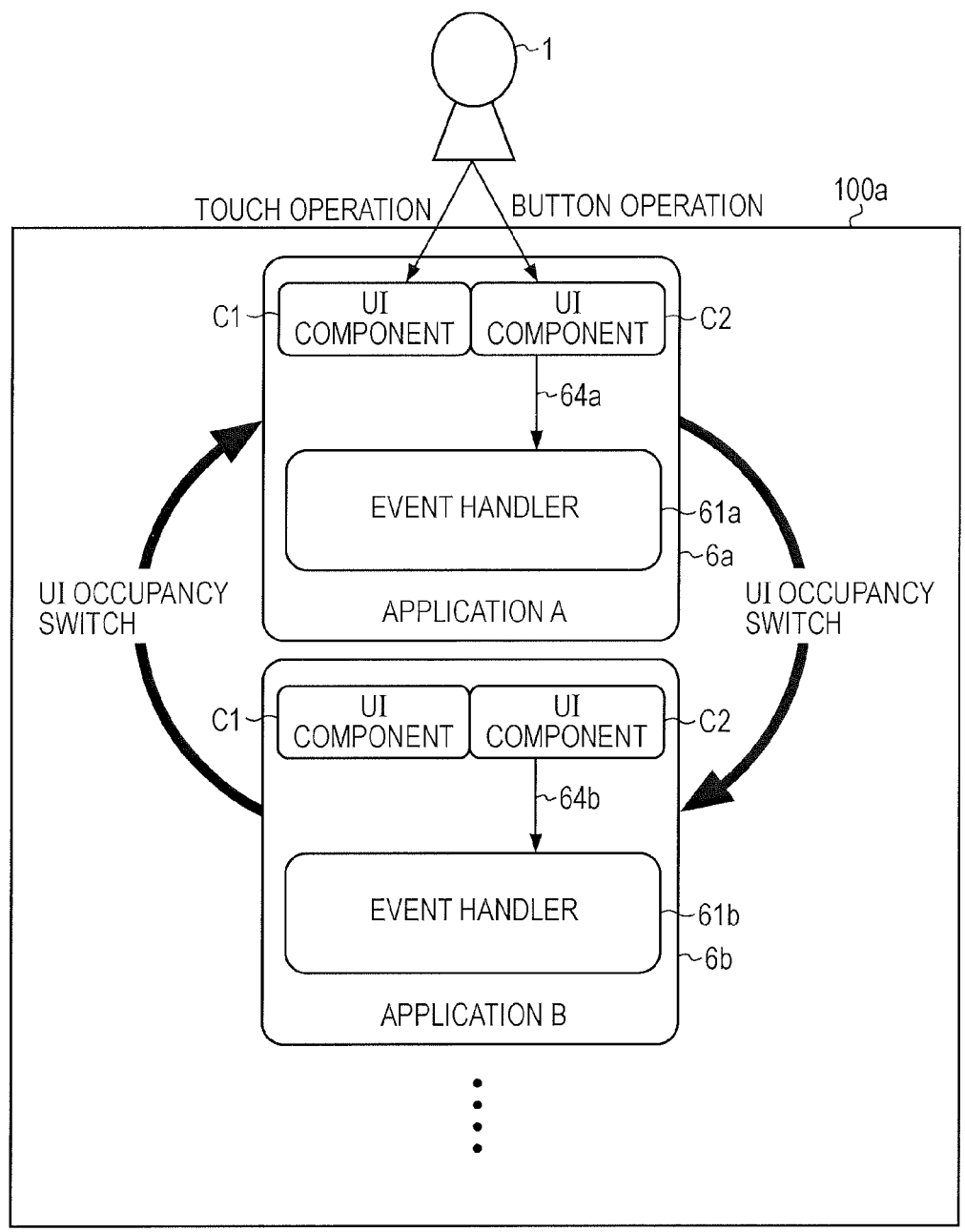
FIG. 4 illustrates an occupancy state of UI components.

The following describes occupancy states of user interface (UI) components occupied by an application in the mobile terminal device 100 having a telephone function. FIG. 4 illustrates an occupancy state of UI components. A mobile telephone 100a having multiple applications 6a, 6b . . . will be used in FIG. 4 for the explanation as the mobile terminal device 100.

In the mobile telephone 100a illustrated in FIG. 4, UI components C1 and C2 that allow a user 1 to implement a touch operation or a button operation are occupied only by one application 6a or 6b being currently used by the user 1.

When the button operation to the UI component C2 is conducted by the user for the application 6a, an event notification 64a is conducted by an event handler 61a. When the user 1 switches from the application 6a to the application 6b, the occupancy states of the UI component C1 and the UI component C2 are switched from the application 6a to the application 6b. When the button operation to the UI component C2 is conducted by the user for the application 6b, an event notification 64b is conducted by an event handler 61b.

Since the UI components C1 and C2 are occupied by only one application 6a or one application 6b, which of applications the event notifications 64a and 64b correspond to can be monitored.

Therefore, when the application 6a is the object of a diagnosis, as described above in the present embodiment, by rewriting of the start command for starting the application 6a to be diagnosed and stored in the start command data region 172, the event notification 64a can be monitored due to the application 6a being executed via the self-diagnosis processing unit 140.

Differences in the execution state of an application due to the implementation of a self-diagnosis will be explained next. FIGS. 5A and 5B illustrate application execution states. FIG. 5A is an example chronologically illustrating a normal execution state when self-diagnosis is not conducted. In the normal execution state illustrated in FIG. 5A, an application is started and initialization processing is conducted when a start command E1 corresponding to an application selected by a user is read out from the start command data region 172 and executed upon the selection of the application by the user.

A command 1 corresponding to an operation 1 is executed when the operation 1 is conducted by the user. Next, a command 2 corresponding to an operation 2 is executed when the operation 2 is conducted by the user. Then a command 3 corresponding to an operation 3 is executed when the operation 3 is conducted by the user.

FIG. 5B is an example chronologically illustrating an execution state when self-diagnosis is conducted. In the execution state illustrated in FIG. 5B, an application is started and initialization processing is conducted when a start command E1' corresponding to an application selected by a user is read out from the start command data region 172 and executed upon the selection of the application by the user.

The start command E1' is a command in which the start command E1 is rewritten such that the application selected by the user is started via the self-diagnosis processing unit 140.

Immediately before the application is started by the start command E1', an operation procedure 7d that guides the user through the operations is displayed on the display unit 13 by the operation procedure adding unit 145 and the user display unit 148 of the self-diagnosis processing unit 140.

Specifically, the user display unit 148 displays the operation procedure 7d on the display unit 13 according to an instruction from the operation procedure adding unit 145. The operation procedure 7d may be displayed, for example, as a message that says "Please press buttons 3, 5, and 7 in order."

Log data that indicates the start of the application is stored in the operation log data region 173 (start record 5a), and initialization processing is conducted by the application. When the user follows the operation procedure 7d and operates button 3 (button 3 operation 1'), log data that indicates that the button 3 was pressed is stored in the operation log data region 173 of the memory unit 170 (operation record 5b).

Next, when the user operates button 5 (button 5 operation 2'), log data that indicates that the button 5 was pressed is stored in the operation log data region 173 of the memory unit 170 (operation record 5c). Then, when the user presses button 2 (button 2 operation 2'), an operation correction display 7e is displayed on the display unit 13 since the button 2 that is different from the button 7 specified in the operation procedure 7d was operated.

This is because the operation record inspecting unit 146 detects that the button 2 operation is an operation that is different from the operation specified in the scenario data 171r. The user operation correcting unit 147 then creates a message based on the operation procedure 7d in response to the detection and the message is displayed on the display unit by the user display unit 148. The operation correction display 7e includes the created message. The contents of the message may be, for example, "Button 2 was pressed. Please press button 7."

Figure 6:
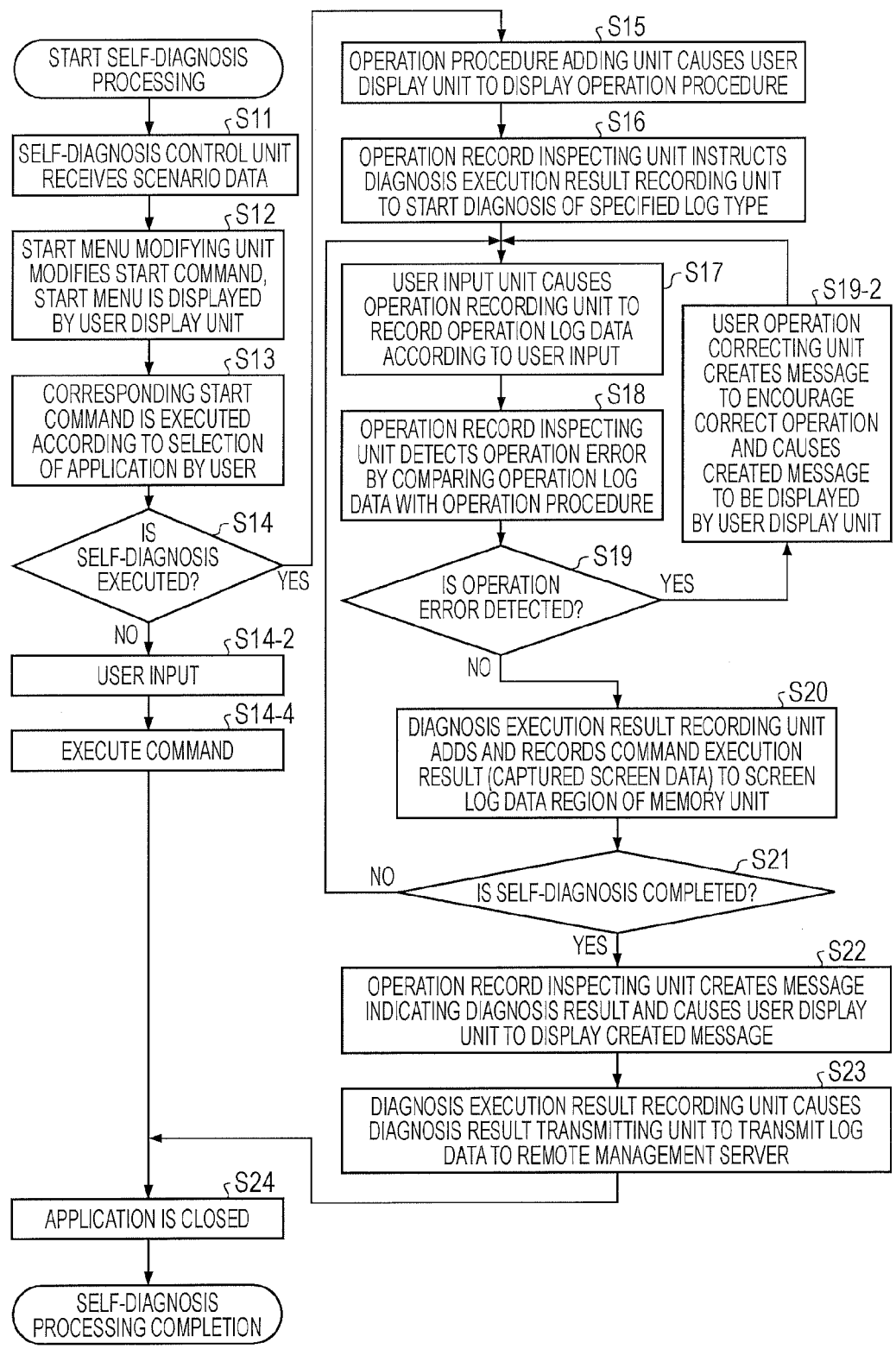
FIG. 6 is a flow chart describing self-diagnosis processing.

The following is an explanation of self-diagnosis processing conducted by the self-diagnosis processing unit 140 in the mobile terminal device 100. FIG. 6 is a flow chart describing self-diagnosis processing. In FIG. 6, the remote management server 200 transmits the scenario data 171r to the mobile terminal device 100 in response to a self-diagnosis activation request received from the help center 300. The mobile terminal device 100 receives the scenario data 171r from the remote management server 200 (S11).

The start menu modifying unit 142 then modifies the start command so that the start menu is displayed on the display unit 13 by the user display unit 148 (S12). The corresponding start command is executed by the user selecting an application from the displayed start menu (S13).

The self-diagnosis control unit 141 determines whether or not the self-diagnosis is executed by the start command to start the application according to the user's selection (S14).

If the self-diagnosis is not executed in S14, the application is executed normally. During the normal application execution, the user inputs data with a touch operation or a button operation (S14-2) so that a command corresponding to the inputted data is executed (S14-4). The application is then completed (S24), and the self-diagnosis processing is also completed.

Conversely, if the self-diagnosis is executed in S14, that is an application accompanying the self-diagnosis is executed, the operation procedure adding unit 145 causes the user display unit 148 to display an operation procedure on the display unit 13 (S15). The operation procedure adding unit 145 also notifies the operation record inspecting unit 146 about the start of the diagnosis. The scenario data 171r is specified in the diagnosis start notification.

In response to the diagnosis start notification, the operation record inspecting unit 146 instructs the diagnosis execution result recording unit 149 to obtain the log type from the scenario data 171r specified in the diagnosis start notification and then start the diagnosis specified in the log type (S16). The operation record inspecting unit 146 also starts processing to obtain new operation log data from the operation log data region 173 of the memory unit 170.

When the user conducts inputs data using the touch operation or button operation according to the operation procedure displayed on the display unit 13, the user input unit 143 adds and records the operation log data indicating the user operation to the operation recording unit 144 in the operation log data region 173 of the memory unit 170 (S17).

The operation record inspecting unit 146 detects an operation error by comparing the operation log data with the operation procedure (S18). The operation record inspecting unit 146 determines whether or not a user operation error was detected (S19). When a user operation error is detected, the operation record inspecting unit 146 notifies the user operation correcting unit 147, and the user operation correcting unit 147 then creates a message to encourage a correct operation and causes the user display unit 148 to display the created message on the display unit 13 (S19-2). The self-diagnosis processing then returns to S17 to conduct the abovementioned processing.

Conversely, if an operation error is not detected in S19, the command corresponding to the user input is executed and the application processing is conducted. The diagnosis execution result recording unit 149 adds and records the command execution result to the screen log data region 175 of the memory unit 170 (S20).

The self-diagnosis control unit 141 determines whether or not the self-diagnosis according to the scenario data 171r is completed (S21). If the self-diagnosis is completed, the self-diagnosis control unit 141 notifies the operation record inspecting unit 146 about the completion of the diagnosis.

The operation record inspecting unit 146 creates a message to indicate the diagnosis result and then causes the user display unit 148 to display the created message on the display unit 13 (S22). The operation record inspecting unit 146 also notifies the diagnosis execution result recording unit 149 about the completion of the diagnosis.

In response to the diagnosis completion notification, the diagnosis execution result recording unit 149 obtains the operation log data specified by the log type from the operation log data region 173 in the memory unit 170 and stores the specified operation log data in the diagnostic operation log data region 174. The diagnosis execution result recording unit 149 then causes the diagnosis result transmitting unit 150 to transmit the log data to the remote management server 200 (S23). The application is then completed (S24), and the self-diagnosis processing is also completed.

Scenario contents included in the email scenario data 171b will be described. FIG. 7 is an example of scenario contents. Scenario contents 7a illustrated in FIG. 7 include description portions that enable activation of the self-diagnosis processing unit 140 such as a request portion ([SelfCheckRequest]) including a contents request related to the object of the self-diagnosis, a log type specifying portion ([Recording]) that specifies a log type for recording, and a scenario portion ([Scenario]) that includes the operation procedure to be operated by the user.

In the request portion ([SelfCheckRequest]), an application execution file name (ReadMail.exe) that executes an email (electronic mail) receiving function to be subjected to the self-diagnosis is specified by a description 71 "Target: ReadMail.exe". The description 71 is referred to by the start menu modifying unit 142. Although an email reception function is referred to in this example, any application execution file name to be subjected to the self-diagnosis may be specified.

An operation procedure message to be displayed on the screen at the start of the self-diagnosis immediately before starting the application is specified by a description 72 (GuideMsg: "Implement operation test, implement operation test. Press "OK" and then press number keys 3-5-7 in order with the active app"). The description 72 is referred to by the operation procedure adding unit 145. The operation procedure adding unit 145 causes the user display unit 148 to display the message "Implement operation test. Press "OK" and then press number keys 3-5-7 in order with the active app" on the display unit 13.

Additionally, processing when a problem occurs during the diagnosis is specified by a description 73 (On_Error: All_Logs). If a problem occurs during the diagnosis, all the log data is transmitted to the remote management server 200 by the diagnosis execution result recording unit 149.

In the log type specifying portion ([Recording]), a type of log data (log type) related to the self-diagnosis is specified by a description 74 (KeyEvent,TraceLog,PanicLog,Snapshot). The description 74 is referred to by the operation record inspecting unit 146 and instructed by the diagnosis execution result recording unit 149. In this example, a "KeyEvent" that specifies a log of an event inputted by the touch operation or button operation by the user, a "TraceLog" that specifies a log related to the application operation, a "PanicLog" that specifies a log related to a state when the problem occurs, and a "Snapshot" that specifies a log of screen data obtained by capturing the screen are specified by the description 74.

Self-diagnosis procedures Step_01, Step_02, Step_03, and Step_04 are described in the scenario portion ([Scenario]). The scenario portion ([Scenario]) is referred to by the operation record inspecting unit 146. The procedures Step_01 to Step_03 among the self-diagnosis procedures Step_01 to Step_04 may be operation procedures to guide the user.

In the self-diagnosis procedure Step_01, the operation record inspecting unit 146 expects the user to press the button 3 according to a description 75 "Expect PushBtn_3". If the user operation does not follow the expected procedure, the operation record inspecting unit 146 determines that there is a user operation error and notifies the user operation correcting unit 147.

Moreover, a description 76 (On_UnExpected: Show "Press CLR button to return") is displayed to send out a message such as "Press CLR button to return" when a user operation error is detected. When the notification about the operation error is received from the operation record inspecting unit 146, the user operation correcting unit 147 instructs the user display unit 148 to cause the display unit 13 to display the message "Press CLR button to return" according to the description 76 (On_UnExpected: Show "Press CLR button to return"). The self-diagnosis procedure Step_02 is the same as procedure Step_01.

In the self-diagnosis procedure Step_03, an indication to restart the application is displayed according to a description 77 (On_UnExpected: Restart_App) when the button 7 (Expect PushBtn_7) that is expected in the procedure is not pressed. The operation record inspecting unit 146 notifies the self-diagnosis control unit 141 when the operated button is not the button 7 which is expected in the user operation. The application is restarted by the self-diagnosis control unit 141.

For example, when a reply operation is conducted to send out an email, an application restart is specified as an action when an incorrect operation occurs in which an operation undo function is ineffective.

In the self-diagnosis procedure Step_04, the completion of the scenario ([Scenario]) is indicated by a description 78 (Final). The description 78 is referred to by the self-diagnosis control unit 141 so that the completion of the scenario is determined.

Furthermore, an operation after the completion of the scenario is indicated by a description 79 (Report All_Logs). In this example, the transmission of all the log data related to the self-diagnosis to the remote management server 200 is indicated. The description 79 is referred to by the operation record inspecting unit 146 and a notification of the diagnosis completion including an instruction to transmit all the log data is sent out to the diagnosis execution result recording unit 149. In response to the diagnosis completion notification, the diagnosis execution result recording unit 149 transmits the operation log data stored in the diagnostic operation log data region 174 of the memory unit 170 and the screen log data stored in the screen log data region 175 to the remote management server 200.

Figure 8:
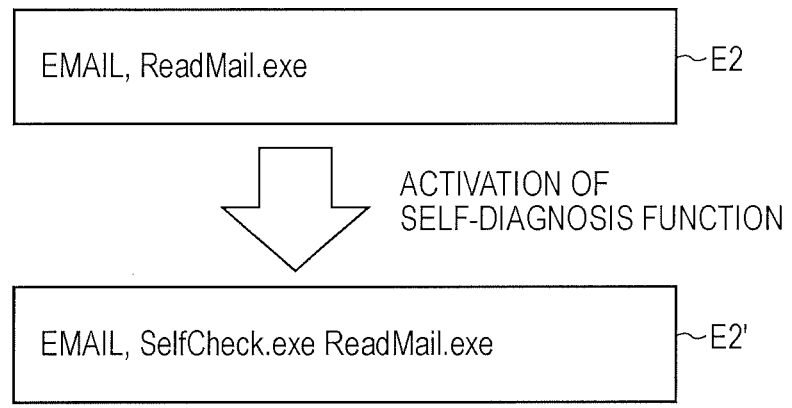
FIG. 8 is an example of modification on a start command.

FIG. 8 is an example of a start command rewriting. An example of the start command rewriting when an email reception function is conducted is explained in FIG. 8. A normal start command E2 that starts an application related to an email reception function is described as "E-mail, ReadMail.exe".

In the present embodiment, the start command E2' with the description "E-mail, SelfCheck.exe ReadMail.exe" is written over the start command E2 to cause the self-diagnosis function to be activated. The self-diagnosis processing unit 140 execution file name "SelfCheck.exe" that implements the self-diagnosis function is inserted before the reception function execution file name "ReadMail.exe". When the start command E2' is selected due to this modification, the application (the email reception function in this example) subject to the testing by the self-diagnosis processing unit 140 is executed as an argument so that the application to be tested is operated under the control of the self-diagnosis processing unit 140.

As a result, reproducibility is excellent since the user can conduct an operation test using the normally used application itself without employing a specialized diagnostic application.

Figure 9:
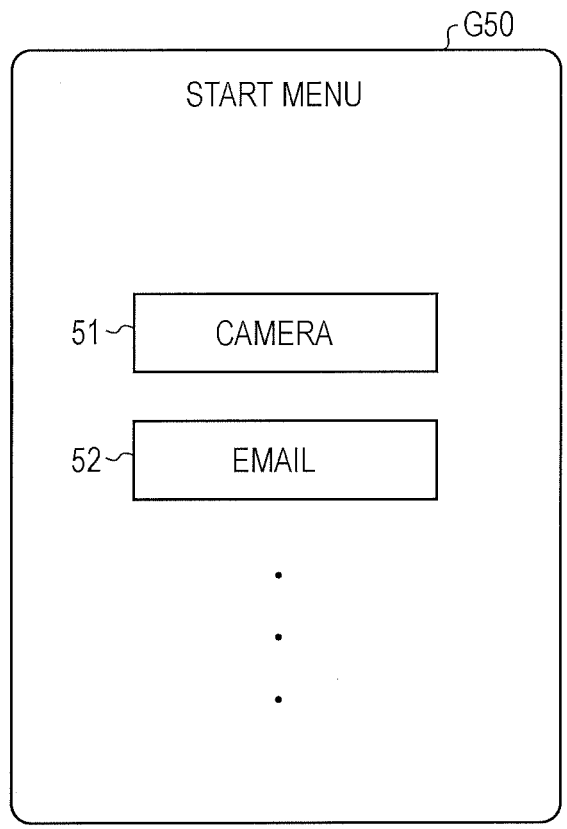
FIG. 9 is an example of a start menu screen display.

FIG. 9 is an example of a start menu screen. A start menu screen G50 illustrated in FIG. 9 includes, for example, a camera button 51 to activate a camera function, and an email button 52 to activate an email function. For example, the start command E2' illustrated in FIG. 8 is executed by the CPU 11 to start the application when a user presses the email button 52 from the start menu screen G50 displayed on the display unit 13. Immediately before starting the application, an operation procedure message, such as the message illustrated in FIG. 10 for example, is displayed.

Figure 10:
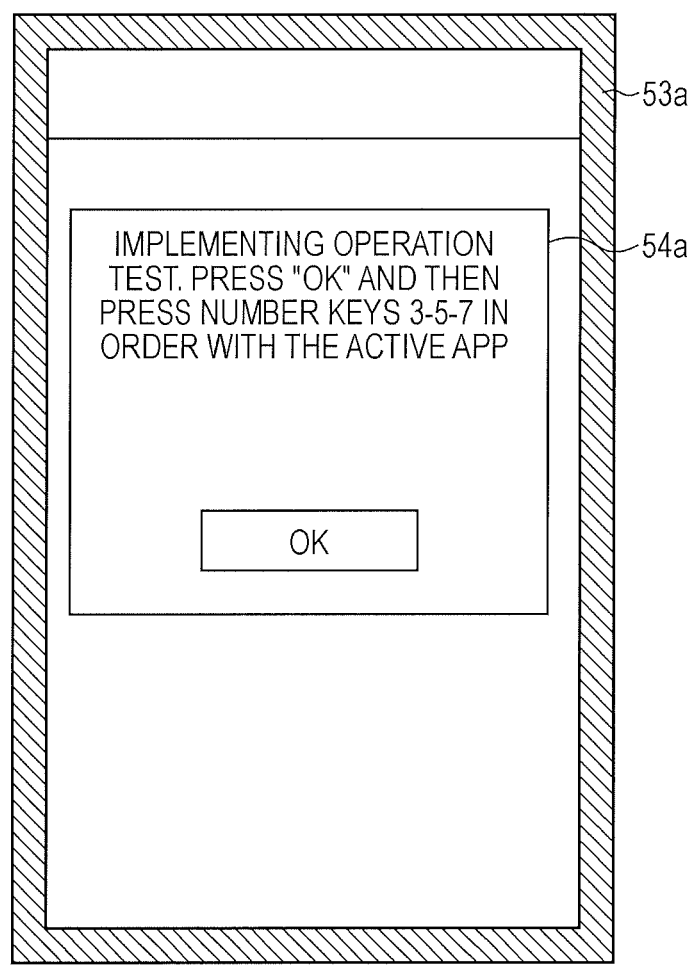
FIG. 10 is an example of an operation procedure message.

FIG. 10 is an example of an operation procedure message. A screen 53a illustrated in FIG. 10 is an example of a screen displayed by the start of the start command E2'. An operation procedure message 54a created by the operation procedure adding unit 145 is displayed on the screen 53a. The operation procedure message 54a is the operation procedure message obtained from the description 72 of the request portion ([SelfCheckRequest]) by referring to the scenario contents 7a illustrated in FIG. 7. Understanding of the user can be encouraged by including an "OK" button with the operation procedure message 54a.

When the user presses the OK button with the operation procedure message 54a, a screen provided by the application is displayed on the display unit 13. The first number key "3" is pressed according to the operation procedure message 54a. The diagnosis execution result recording unit 149 captures the screen to obtain the screen data in response to the keying event.

Figure 11:
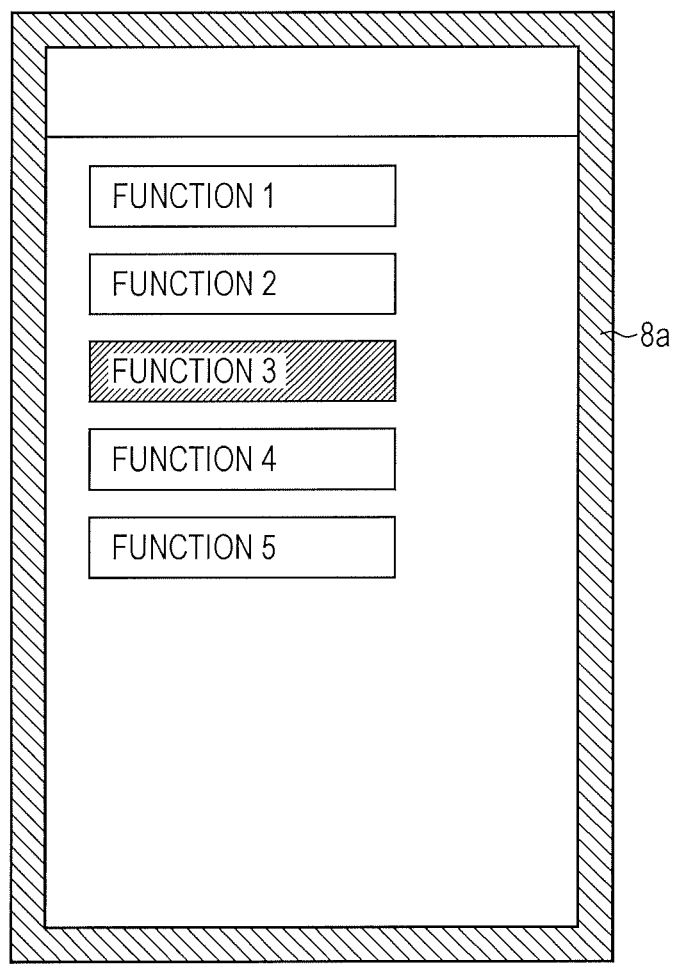
FIG. 11 is an example of screen capture image data indicating a user selection.

FIG. 11 is an example of screen data captured in response to a user selection. Screen data 8a illustrated in FIG. 11 is an example of captured screen data of a state in which the user selects the number key "3" corresponding to a function 3 from a screen that includes buttons that respectively correspond to functions 1 to 5. The screen data 8a is stored in the screen log data region 175 of the memory unit 170 by the diagnosis execution result recording unit 149.

Figure 12:
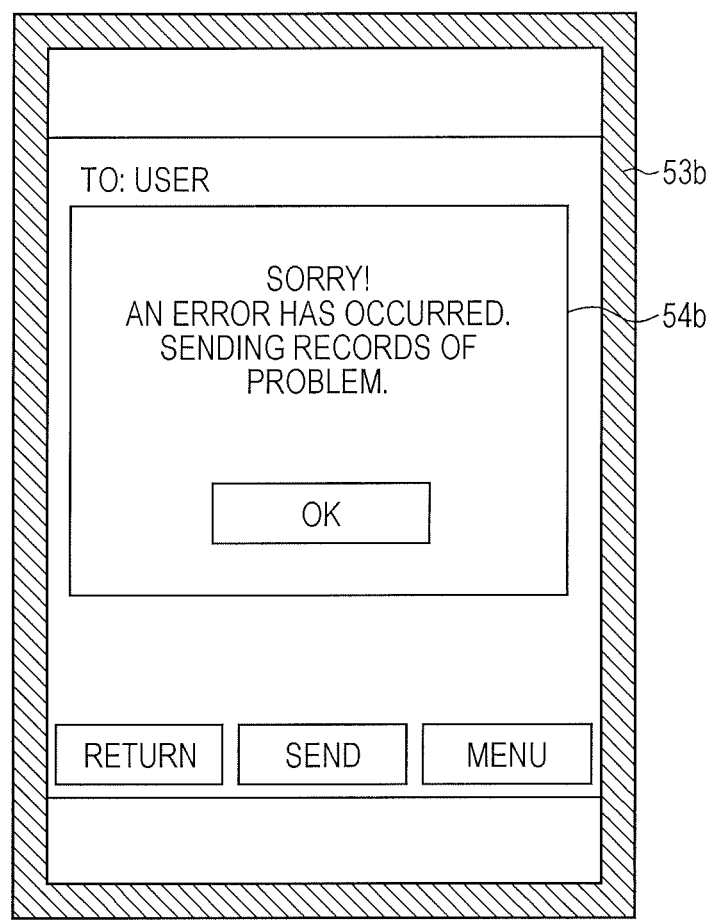
FIG. 12 is an example of a diagnosis result message.

FIG. 12 is an example of a diagnosis result message. When a problem occurs during a self-diagnosis, a diagnosis result message 54b is displayed on a screen 53b for activating an email function. A message such as "Sorry! An error has occurred. Sending records of problem" is displayed according to the diagnosis result message 54b.

In this way, the user can foresee whether or not the device needs to be deposited at the dealer for repairs before going to the dealer according to the display of the diagnosis result message 54b.

Figure 13:
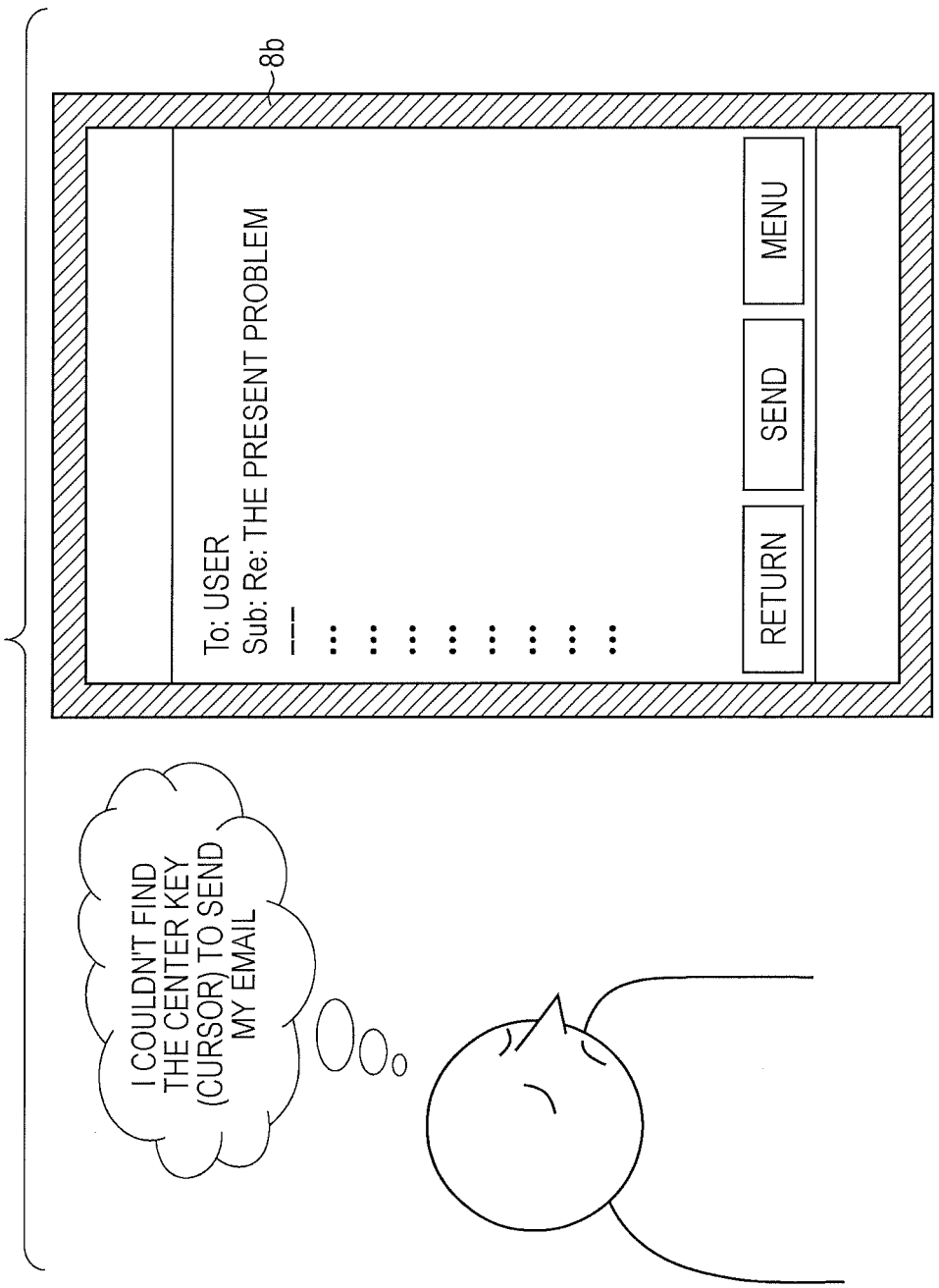
FIG. 13 is an example of the situation when a user operation was not correct.

FIG. 13 is an example of screen data when a user operation error occurs. Screen data 8b illustrated in FIG. 13 is an example of screen data captured in a state in which the user does not know which button to press. The screen data 8b is stored in the screen log data region 175 of the memory unit 170 by the diagnosis execution result recording unit 149.

Figure 14:
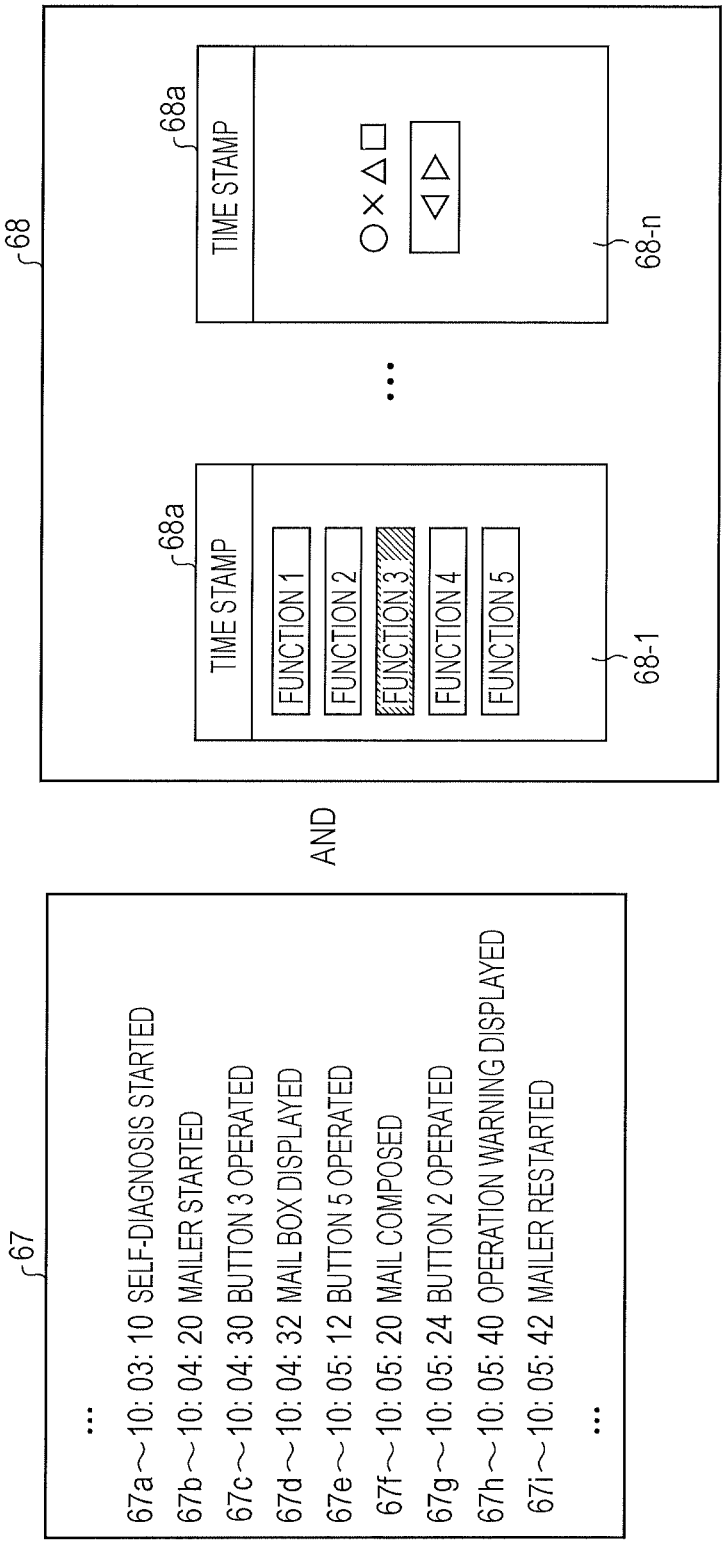
FIG. 14 is an example of log data transmitted to a remote management server.

FIG. 14 is an example of log data transmitted to a remote management server. The log data 9 transmitted to the remote management server 200 by the diagnosis execution result recording unit 149 is illustrated as an example in FIG. 14. Operation log data 67 is an example of operation log data stored in the diagnostic operation log data region 174 of the memory unit 170. The operation log data 67 includes an operated time and an operation result.

The operation log data 67 includes logs such as log 67a to log 67i. In the operation log data 67, the log data 67a "10:03:10 self-diagnosis started" indicates that the SelfCheck.exe is executed first by the execution of the start command E2' illustrated in FIG. 8. Log data 67b "10:04:20 mailer started" indicates that the ReadMail.exe is executed next.

Log data 67c "10:04:30 button 3 operated" indicates that the user operated the button 3, and log 67d "10:04:32 mail box displayed" indicates that a mail box was displayed according to the operation of the button 3.

Log data 67e "10:05:12 button 5 operated" indicates that the user operated the button 5, and log data 67f "10:05:20 mail composed" indicates that an email composing state was opened according to the operation of the button 5.

Log data 67g "10:05:24 button 2 operated" indicates that the user operated the button 2. Log data 67h "10:05:40 operation warning displayed" and log data 67i "10:05:42 mailer restarted" indicate that an operation warning display was displayed and then the mailer was restarted since the button 2 operated by the user is different from the expected operation.

Screen log data 68 includes screen data 68-1 to 68-n which is data captured from multiple screens during the self-diagnosis and stored in the screen log data region 175 of the memory unit 170.

A time stamp indicating the time the screen data was captured is added to the screen data 68-1 to 68-n in the screen log data 68.

As described above in the present embodiment, an application that the user normally uses is applied instead of employing a specialized diagnostic application. As a result, a problem that occurs when the application is actually being used can be diagnosed due to the ability of the user to operate the mobile terminal device 100 by him or herself.

Further, a problem related to the user's operation can be detected since the user is operating the application that the user normally operates. A problem due to an application being operated in error due to an unanticipated operation by the user can be detected. Alternatively, conditions considered to be a problem in an application due to the user not being accustomed to the operation method can be confirmed. In this case, the fact that the application indicates a correct operation can be understood from the log data 9 transmitted to the remote management server 200.

Moreover, when the operation procedure is displayed or an operating error occurs, the user can learn the correct operation when a message (operation guide) that encourages the correct operation is displayed. Therefore, an unnecessary request to deposit the device for repairs is not conducted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various modifies, substitutions, and alterations could be made hereto without departing from the spirit and scope of the invention.

What is claimed is:

1. A mobile terminal device comprising:
a self-diagnosis unit that, in response to a user operation on an application to be diagnosed, diagnoses a problem in the application;
a modifying unit that modifies a start command to start the application in a state of the self-diagnosis unit is activated;
a specification receiving unit that executes the modified start command upon receiving a specification of the application;
an operation procedure display unit that displays an operation procedures that a user executes before a start of the application when the modified start command is executed;
a memory unit in which log data recording results of a user operations on the application is stored by the activated self-diagnosis unit; and
a log data transmitting unit that transmits the log data stored in the memory unit through a network to a remote management server that manages the application problem when a completion of the diagnosis by the self-diagnosis unit is detected.

2. The mobile terminal device according to claim 1 wherein, the self-diagnosis unit conducts a diagnosis of the application problem by determining whether the user operation matches the operation procedure based on the operation procedures included in scenario data received from the remote management server.

3. The mobile terminal device according to claim 2, further comprising:
an operation correcting unit that executes an operation correction display that, when the self-diagnosis unit determines that the user operation does not match the expected operation procedure, displays the user operation that does not match and an operation specified in the operation procedure.

4. The mobile terminal device according to claim 3 wherein, the operation procedure display unit displays the operation procedure included in the scenario data.

5. The mobile terminal device according to claim 4, wherein
in response to the user operation, the self-diagnosis unit stores, in the memory unit, operation log data that records the operations, and screen log data that contains screen captured image data which is recorded during using the application, the screen log data having a time stamp added thereto; and
the log data transmitting unit transmits the log data including the operation log data and the screen log data to the remote management server.

6. The mobile terminal device according to claim 5, further comprising:
a telephone communication unit that enables communication through a telephone network.

7. A self-diagnosis method executed by a computer, wherein the computer diagnoses, in response to a user operation on an application to be diagnosed, a problem in the application;
modifies a start command to start the application in a state in which the diagnose is activated;
executes the modified start command upon receiving a specification of the application;
displays an operation procedure to be executed by a user before the start of the application when the modified start command is executed;
stores log data indicating a result of the user operation on the application according to the activated diagnosing; and
transmits the stored log data through a network to a remote management server that manages the problem of the application when the diagnosing is detected as completed.

8. A non-transitory, computer readable storage medium storing a program that causes a computer to conduct processing, the processing comprising:
diagnosing, in response to a user operation on an application to be diagnosed, a problem in the application;
modifying a start command to start the application in a state in which the diagnosing is activated;
executing the modified start command upon receiving an instruction of the application;
displaying an operation procedure to be executed by a user before the start of the application when the modified start command is executed;
storing log data indicating a result of the user operation on the application by the activated diagnosing; and
transmitting the stored log data through a network to a remote management server that manages the problem of the application when the diagnosing is detected as completed.

* * * * *